United States Patent
Oguchi (10) Patent No.: US 6,487,046 B1
(45) Date of Patent: Nov. 26, 2002

(54) HEAD SUPPORT MECHANISM IN MAGNETIC CARD READER

(75) Inventor: Koji Oguchi, Shimosuwa-Machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 33 days.

(21) Appl. No.: 09/658,320

(22) Filed: Sep. 8, 2000

(30) Foreign Application Priority Data

Sep. 8, 1999 (JP) .......................................... 11-254686

(51) Int. Cl.$^7$ ................................................ G11B 5/48
(52) U.S. Cl. ............................ 360/240; 360/2; 235/449
(58) Field of Search ............................ 360/240, 251.1, 360/241, 241.3, 2; 235/449, 483

(56) References Cited

U.S. PATENT DOCUMENTS

| | | | | |
|---|---|---|---|---|
| 4,631,610 A | * | 12/1986 | Kobayashi et al. | ......... 360/240 |
| 4,937,438 A | * | 6/1990 | Warwick et al. | ............ 235/449 |
| 5,107,099 A | * | 4/1992 | Smith | ........................ 235/449 |
| 5,191,198 A | * | 3/1993 | Do | .............................. 235/483 |
| 5,196,680 A | * | 3/1993 | Schuder | ..................... 235/449 |
| 5,196,687 A | * | 3/1993 | Sugino et al. | .............. 235/483 |
| 5,463,678 A | * | 10/1995 | Kepley, III et al. | ..... 379/144.04 |
| 5,912,446 A | * | 6/1999 | Wong et al. | ................ 235/449 |
| 6,176,426 B1 | * | 1/2001 | Kanayama et al. | ......... 235/449 |
| 6,250,552 B1 | * | 6/2001 | Hirasawa | .................... 235/475 |

FOREIGN PATENT DOCUMENTS

| | | |
|---|---|---|
| EP | 1 083 551 A2 | 3/2001 |
| JP | 63-144470 | * 6/1988 |

* cited by examiner

*Primary Examiner*—Jefferson Evans
(74) *Attorney, Agent, or Firm*—Reed Smith LLP

(57) ABSTRACT

An improved head support mechanism for a magnetic card reader is described which has a support plate for each magnetic head. The magnetic head is supported to be capable of moving in the plane perpendicular to the support plate and rocking around an axis parallel to the direction in which the card is moved. A projection is placed in a predetermined position on each support plate. A leaf spring contacts each projection at the predetermined position to apply pressure and ensure that the magnetic head contacts the magnetic card to be read.

11 Claims, 7 Drawing Sheets

FIG. 1

Card transferring direction

FIG. 2A

Card transferring direction

Card transferring direction

Card transferring direction

HEAD SUPPORT MECHANISM IN MAGNETIC CARD READER

FIELD OF INVENTION

The present invention relates to a head support mechanism in a magnetic card reader comprising a head support plate, which supports a magnetic head, and a leaf spring that applies pressure to the head support plate toward a magnetic card.

DESCRIPTION OF THE RELATED ART

Figure 7A:
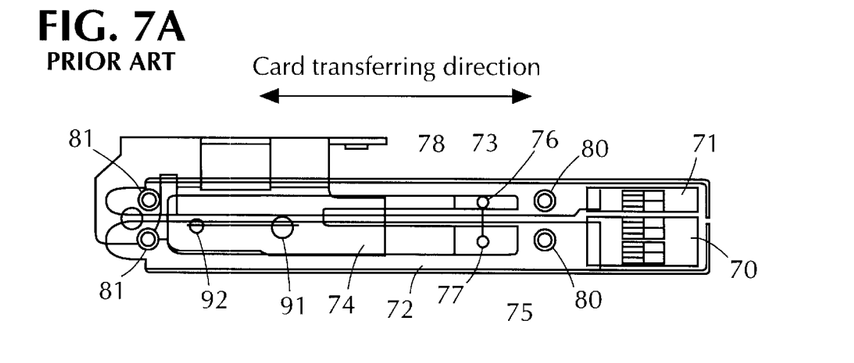
FIGS. 7(a) and 7(b) are an overhead view and a side view, respectively, of a head support mechanism of the prior art.
Figure 7B:
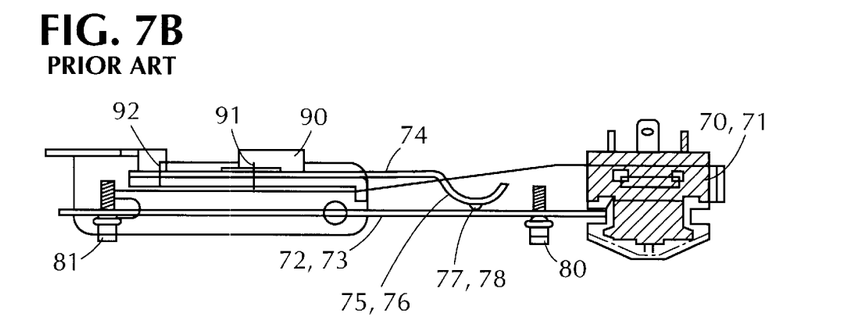

When a magnetic card having a magnetic strip is transferred on a card transferring path in a magnetic card reader, magnetic information on the magnetic strip is read out from or written onto the card by a magnetic head placed on the card transferring path. FIGS. 7(a)–7(b) show a magnetic head support mechanism of conventional technology. FIG. 7(a) is an overhead view, and FIG. 7(b) is a side view of a cross section.

As shown in FIGS. 7(a) and 7(b), magnetic heads 70 and 71 are placed next to each other in the direction perpendicular to the card transferring direction. Magnetic head 70 is supported by head support plate 72 while magnetic head 71 is supported by head support plate 73. Head support plates 72 and 73 are formed of a rigid material and restrained by two positioning pins 80 and 81 formed on a head support mechanism body (not shown) Accordingly, magnetic heads 70 and 71 supported by head support plates 72 and 73 can rock and move back and forth.

Leaf spring 74 is formed above head support plates 72 and 73. Leaf spring 74 is fixed to part 90 (see FIG. 7(b)) of the head support mechanism body (not shown) with fixing portions 91 and 92 such as screws. The end of leaf spring 74 is split into two pieces (arm portions); one of the arm portions, 75, applies pressure on head support plate 72 toward the magnetic card (downward in FIG. 7(b)) while other arm portion, 76, applies pressure on head support plate 73 toward the magnetic card (downward in FIG. 7(b)).

Figure 8:
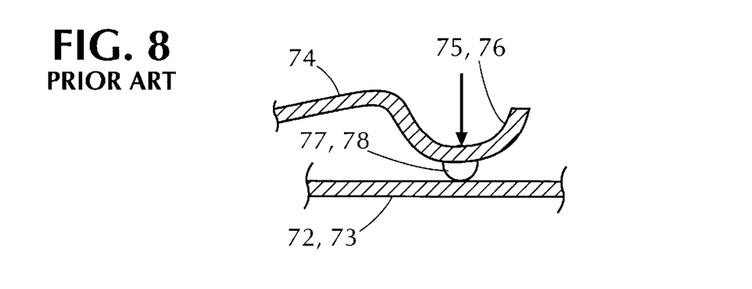
FIG. 8 is a cross section of a pressure applying portion and a projecting portion of the head support mechanism of the prior art.

As shown in FIGS. 7(b) and 8, one end of arm portions 75 and 76, which is facing head support plate 72 and 73, respectively, is warped to form a hemisphere. A section of arm portions 75 and 76 at which arm portions 75 and 76 contact head support plates 72 and 73 has hemispheric projecting portions 77 and 78, respectively. Accordingly, projecting portion 77 of arm portion 75 applies pressure on head support plate 72 toward the magnetic card while projecting portion 78 of arm portion 76 applies pressure on head support plate 73 toward the magnetic card. As a result, magnetic heads 70 and 71 come in contact with the magnetic card with a given pressure applied by a pad placed across from magnetic heads 70, 71.

Movement of head support plates 72 and 73 needs to follow the warped shape of the magnetic card. Therefore, head support plates 72 and 73 can rock in the direction perpendicular to the card transferring direction with the two positioning pins 80 and 81 as an axis. Positioning pins 80 and 81 also function to establish an axis of a rocking motion of magnetic head 70 and 71.

However, head support plates 72 and 73 and leaf spring 74 are separate parts. Therefore, if the relative position of head support plates 72 and 73 and leaf spring 74 is not precise during assembly of these parts, projecting portions 77 and 78 will be displaced from the line between positioning pins 80 and 81. As a result, application of pressure by projecting portions 77 and 78 to head support plates 72 and 73 is no longer along the axis. Additionally, it is extremely troublesome to precisely position head support plates 72 and 73 and leaf plate 74 to enable projecting portions 77 and 78 to apply pressure to head support plates 72 and 73 on the line between positioning pins 80 and 81 towards the magnetic card.

The present invention intends to solve the above issues of conventional technology and to provide a head support mechanism in a magnetic card reader such that even when the alignment of the head support plates with the leaf spring is not precise, the leaf spring can continuously apply pressure to the head support plate at the desired position and the magnetic heads are brought in contact with a magnetic card with high accuracy.

SUMMARY OF THE INVENTION

The present invention provides a head support mechanism in a magnetic card reader comprising a head support plate that supports a magnetic head such that said magnetic head is able to rock and move in a plane perpendicular to the direction in which a magnetic card is transferred and a leaf spring for applying pressure to said head support plates towards the magnetic card such that the magnetic head comes in contact with said magnetic card. Formed on the head support plate is a projecting portion, which extends in a direction perpendicular to the card transferring direction and is provided for contacting a pressure applying portion formed on the leaf spring.

BRIEF DESCRIPTION OF THE DRAWINGS

The accompanying drawings are included to provide an understanding of the invention and constitute a part of the specification.

FIG. 4(b) is a perspective view of a portion of

DESCRIPTION OF THE INVENTION

Figure 1:
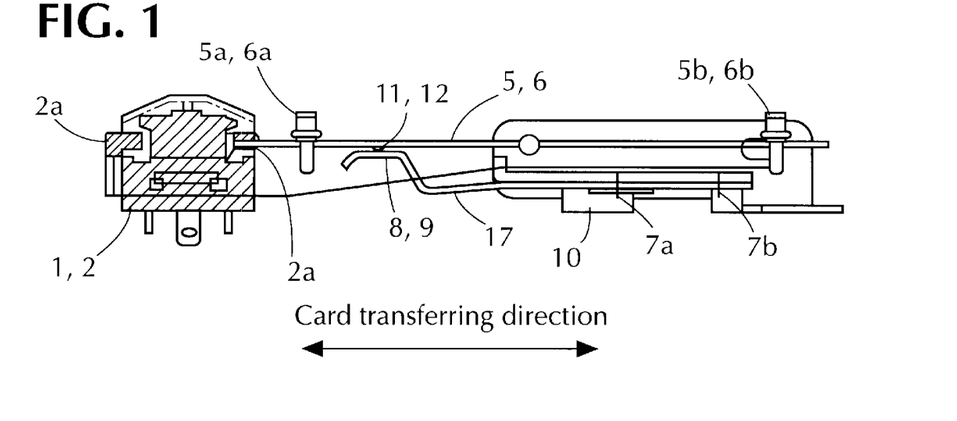
FIG. 1 is a side view of a first embodiment of a head support mechanism in a magnetic card reader according to the present invention.
Figure 5A:
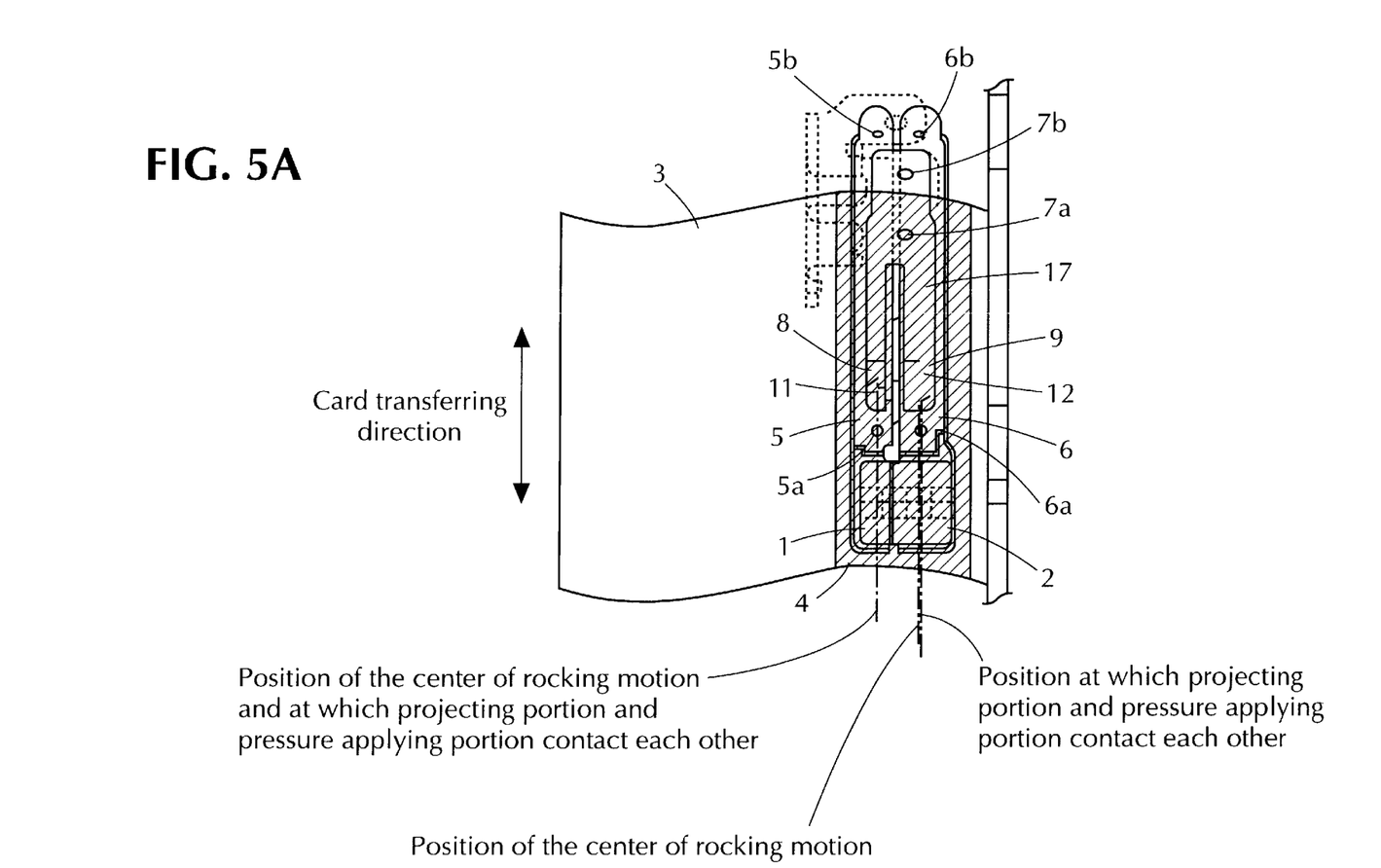
FIG. 5(a) is a view from the top of the first embodiment of a head support mechanism in a magnetic card reader developed according to the present invention.
Figure 5B:
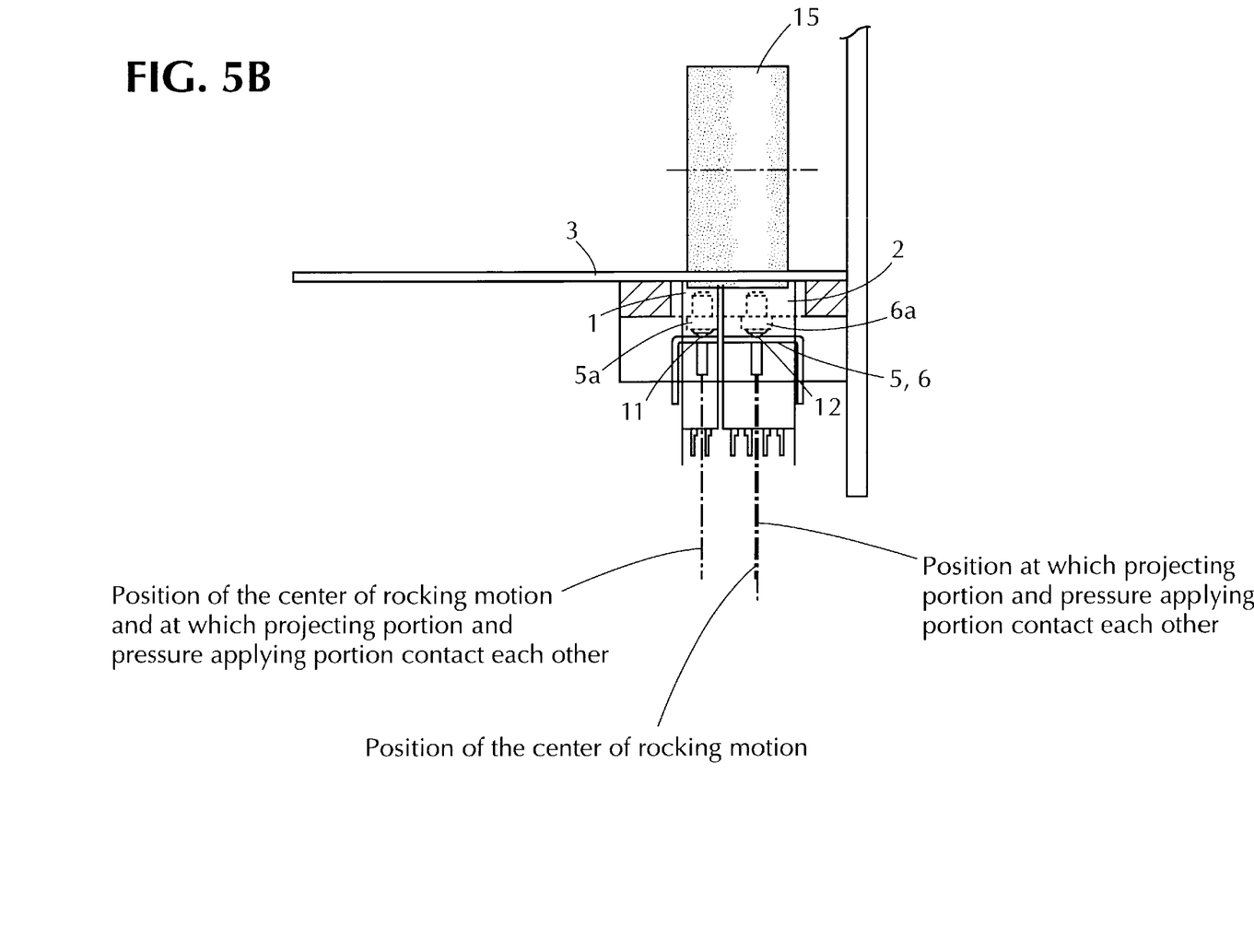
FIG. 5(b) is a longitudinal section of the same.

The following describes an embodiment of a head support mechanism in a magnetic card reader according to the present invention in reference to drawings. FIG. 1 is a cross section of a head support mechanism in a magnetic card reader according to the present invention. FIGS. 5(a) and 5(b) are an overhead view and a front view, respectively, of the same. As shown in FIGS. 1, 5(a) and 5(b), magnetic heads 1 and 2 are placed next to each other in the direction perpendicular to the card transferring direction. Magnetic heads 1 and 2 are positioned such that the surface of the magnetic heads having gaps extends over the card transferring path. Magnetic heads 1 and 2 perform magnetic processing, such as reading and writing of magnetic information, on magnetic strip 4 of magnetic card 3 which is transferred on the card transferring path of the magnetic card reader.

Magnetic head 1 is fixed to one end of head support plate 5 with an adhesive or the like. Also, magnetic head 1 supported by head support plate 5 can rock and move back and forth on a plane perpendicular to the card transferring direction. Head support plate 5 is formed of a rigid material and is restrained by two positioning pins 5a and 5b formed on a head support mechanism body (not shown). Positioning pins 5a and 5b, especially 5a, function as a guide such that head support plate 5 rocks within a given range in the direction perpendicular to the card transferring direction. Therefore, magnetic head 1 supported by head support plate 5 can rock and move back and forth.

Two positioning pins 5a and 5b function to establish the axis of a rocking motion of magnetic head 1. Head support plate 5 can also rock around positioning pins 5(a) and 5(b) such that magnetic head 1 can follow the warped shape of magnetic card 3. In addition, head support plate 5 has projecting portion 11 on a line between positioning pins 5a and 5b discussed later.

Also, magnetic head 2 is fixed to one end of head support plate 6 using an adhesive or the like (2A of FIG. 1) and supported thereby such that magnetic head 2 can rock and move back and forth within a plane perpendicular to the card transferring direction. Head support plate 6 is formed of a rigid material and is restrained by two positioning pins 6a and 6b formed on a head support mechanism body (not shown). Therefore, magnetic head 2 supported by head support plate 6 can rock and move back and forth.

Positioning pins 6a and 6b form an axis of a rocking motion of magnetic head. Therefore, head support plate 6 can rock around positioning pins 6a and 6b such that magnetic head 2 can follow the warped shape of magnetic card 3. Further, projecting portion 12 is formed on a position displaced from a line between positioning pins 6a and 6b to correspond to the warped shape of a magnetic card. In other words, in the case that it is desirable to shift the position of projecting portion 12 off the line between the positioning pins to correspond to the warped shape of magnetic card 3, it is arranged so (see FIG. 5(a)).

Head support plates 5 and 6 have leaf spring 17. Leaf spring 17 is mounted onto part 10 (see FIG. 1) of the head support mechanism body (not shown) with fixing members 7a and 7b, such as screws. One end of leaf spring 17 is split into two pieces (arm portions). The edge of the arm portions form pressure applying portions 8 and 9. Pressure applying portion 8 applies pressure to head support plate 5 towards the magnetic card (upwards in FIG. 1) such that magnetic head 1 comes in contact with magnetic card 3 while pressure applying portion 9 applies pressure to head support plate 6 toward the magnetic card (upwards in FIG. 1) such that magnetic head 2 comes in contact with magnetic card 3.

Figure 2A:
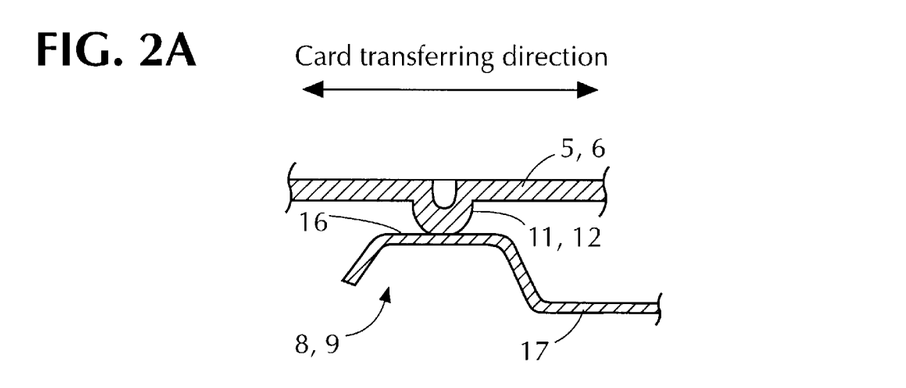
FIG. 2(a) is a cross section showing a pressure applying portion and a projecting portion used in the first embodiment.
Figure 2B:
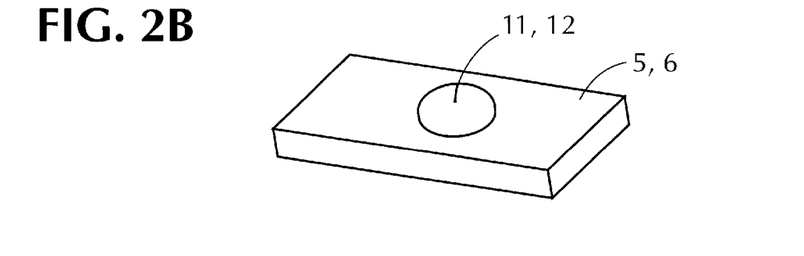
FIG. 2(b) is a perspective view of a portion of FIG. 2(a).

As shown in FIGS. 1 and 2(a), pressure applying portions 8 and 9 of leaf spring 17 are warped such that the side thereof facing head support plates 5 and 6 is convex. Also, head support plate 5 has hemispheric projecting portion 11 at the position in contact with pressure applying portion 8, in the direction perpendicular to the card transferring direction. Projecting portion 11 is formed as an integral portion of head support plate 5 that projects such that head support plate 5 can rock. Therefore, when pressure applying portion of leaf spring 17 applies pressure to projecting portion 11, head support plate 5 is pushed towards the magnetic card (upwards in FIG. 1). Accordingly, magnetic head 1 is brought in contact with magnetic card 3 with a given pressure applied by a pad or the like placed across from magnetic head 1.

Also, head support plate 6 has hemispheric projecting portion 12 at the position in contact with pressure applying portion 9 in the direction perpendicular to the card transferring direction. Projecting portion 12 is formed as an integral projection of head support plate 6 that projects such that head support plate 6 can rock. Therefore, when pressure applying portion of leaf spring 17 applies pressure to projecting portion 12, head support plate 6 is pushed towards the magnetic card (upward in FIG. 1). Accordingly, magnetic head 2 is brought in contact with magnetic card 3 with a given pressure applied by a pad or the like placed across from magnetic head 1. Moreover, as shown in FIG. 5(b), magnetic heads 1 and 2 have pad roller 15 which also applies a given pressure to magnetic heads 1 and 2 to bring them in contact with magnetic card 3.

Either pressure applying portions 8 and 9 of leaf spring 17 or projecting portions 11 and 12 of head support plates 5 and 6 are elongated to a given length such that the pressure applying portions and the projecting portions come in contact with each other. FIG. 2(a) shows a configuration in which a part of pressure applying portions 8 and 9 of leaf spring 17 is extended in the card transferring direction to form horizontal portion 16. Accordingly, projecting portions 11 and 12 contact pressure applying portions 8 and 9 of leaf spring 17 within the length of horizontal portion 16 of pressure applying portions 8 and 9.

More specifically, projecting portions 11 and 12 of head support plates 5 and 6, on one side in relation to the card transferring direction, are formed to contact pressure applying portions 8 and 9 of leaf spring 17 on the other side at one point thereof wherein pressure applying portions 8 and 9 have horizontal portion 16 which extends in the card transferring direction.

As described above, projecting portion 11 contacts pressure applying portion 8 of leaf spring 17 at one point. This contacting point is located on the line between positioning pins 5a and 5b as shown in FIG. 5(a). Also, projecting portion 12 contacts pressure applying portion 9 of leaf spring 17 at one point. This contacting point is located off the line between positioning pins 6a and 6b to correspond to the warped shape of magnetic card 3 (see FIG. 6(a)).

As mentioned previously in the prior art, when the relative position of head support plates 72 and 73 and leaf spring 74 is not precise, projecting portions 77 and 78 come off the line between the positioning pins. As a result, projecting portions 77 and 78 can no longer apply pressure to head support plates 72 and 73 towards the magnetic card on the line between the positioning pins.

Therefore, in the first embodiment, projecting portions 11 and 12, which contact pressure applying portions 8 and 9 of leaf spring 17, are formed on head support plates 5 and 6, respectively, in the direction perpendicular to the card transferring direction. Accordingly, pressure applying portions 8 and 9 of leaf spring 17 apply pressure on projecting portions 11 and 12.

In this configuration, either pressure applying portions 8 and 9 of leaf spring 17 or projecting portions 11 and 12 of head support plates 5 and 6 are elongated to a given length. Therefore, even when the relative positions of head plates 5 and 6 and leaf spring 17 are not precisely assembled, pressure applying portions 8 and 9 can apply pressure to a constant position, that is projecting portions 11 and 12 of head support plates 5 and 6. As a result, magnetic heads 1 and 2 can precisely come in contact with magnetic card 3. Also, projecting portions 11 and 12 can be formed as separate parts, instead of being formed as an integral portion of head support plates 5 and 6.

Projecting portion 11 of head support plate 5 contacts pressure applying portion 8 of leaf spring 17 on the line between positioning pins 5a and 5b. Therefore, even though the relative positions of head support plate 5 and leaf spring 17 are not precise, pressure applying portion 8 of leaf spring 17 can always apply pressure to projecting portion 11 of head support plate 5 on the above line. Also, magnetic head 1 can precisely follow the warped shape of magnetic card 3 by rocking head support plate 5 around the positioning pins.

Also, projecting portion 12 of head support plate 6 is displaced from the line between positioning pins 6a and 6b; it contacts pressure applying portion 9 of leaf spring 17 at this position. Therefore, as shown in FIG. 6(b), even though the surface of magnetic card 3 having a magnetic strip is warped, magnetic head 2 can excellently follow the warped shape of magnetic card 3 by rocking head support plate 6 around the positioning pins.

Figure 6A:
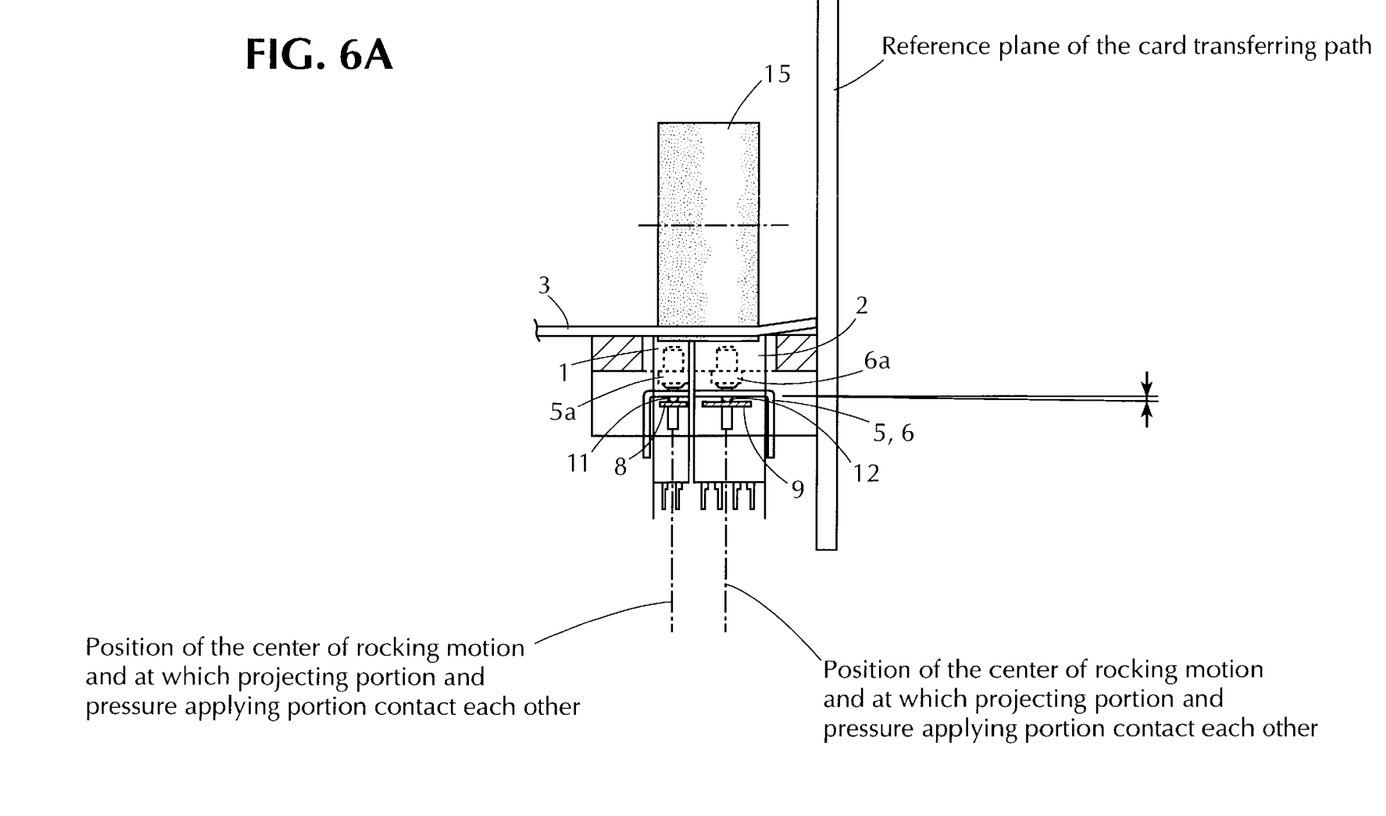
FIG. 6(a) is a longitudinal section of a third embodiment of the present invention.

As shown in FIG. 6(a), even when projecting portion 12 of head support plate 6 contacts pressuring point 9 of leaf spring 17 on the line between the positioning pins, magnetic head 2 can follow the warp of magnetic card 3 by rocking head support plate 6 around the positioning pins. However, in order for magnetic head 2 to follow the warp of magnetic card 3 in the best condition, it is preferable to bring projecting portion 12 of head support plate 6 in contact with pressure applying portion 9 of leaf spring 17 at a position best for corresponding to the warp of magnetic card 3 regardless of the above line.

Figure 6B:
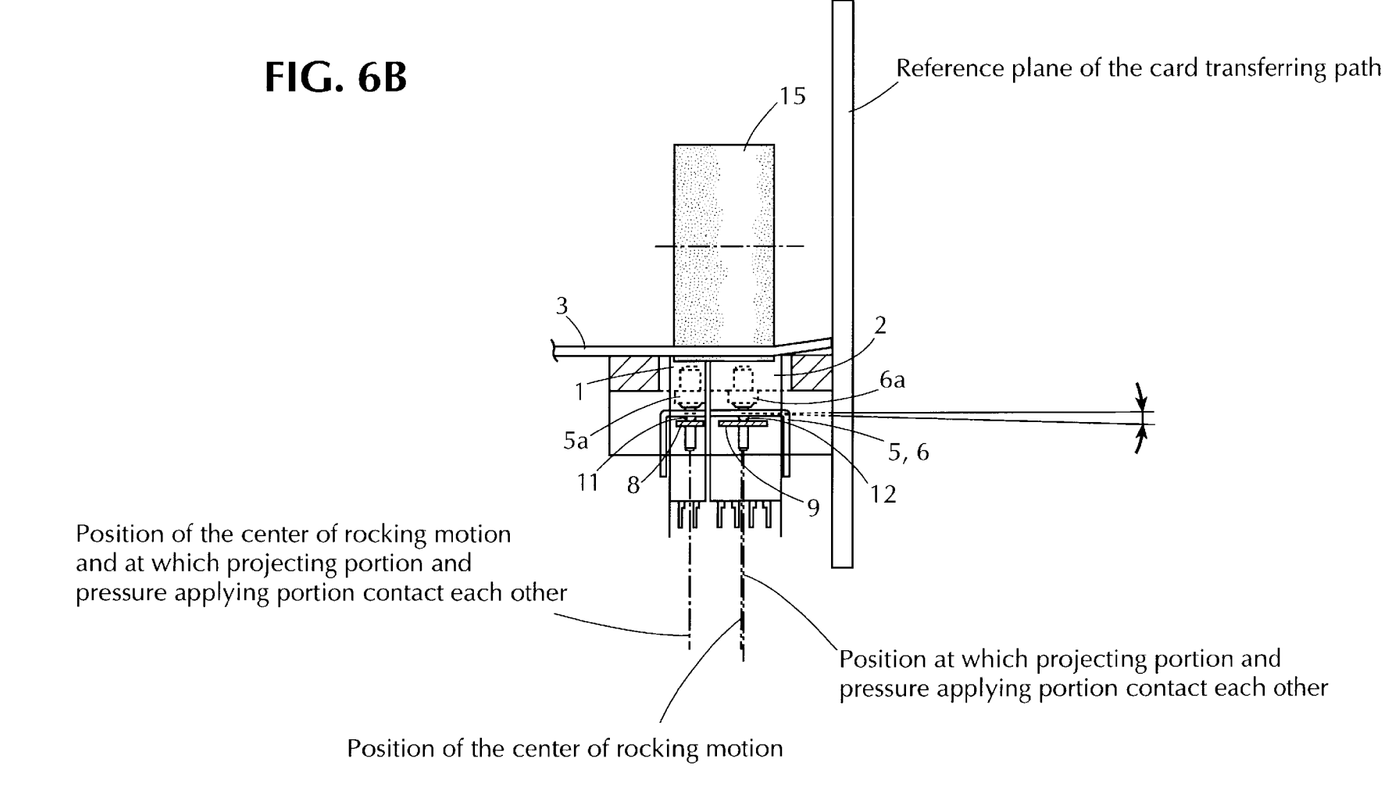
FIG. 6(b) is a longitudinal section of a fourth embodiment of the present invention.

Also, according to FIGS. 5(a), 5(b) and 6(b), projecting portion 11 of head support plate 5 is brought in contact with pressure applying portion 8 of leaf spring 17 on the line between the positioning pins while projecting portion 12 of head support plate 6 is brought in contact with pressure applying portion 9 of leaf spring 17 at a position off the line to correspond the warp of magnetic card 3. However, projecting portion 11 of head support plate 5 can also be brought in contact with pressure applying portion 8 at a position off the line, if magnetic card 3 is warped towards both magnetic head 1 and magnetic head 2. Accordingly, magnetic head 1 can precisely follow the warped shape of magnetic card 3.

Figure 3:
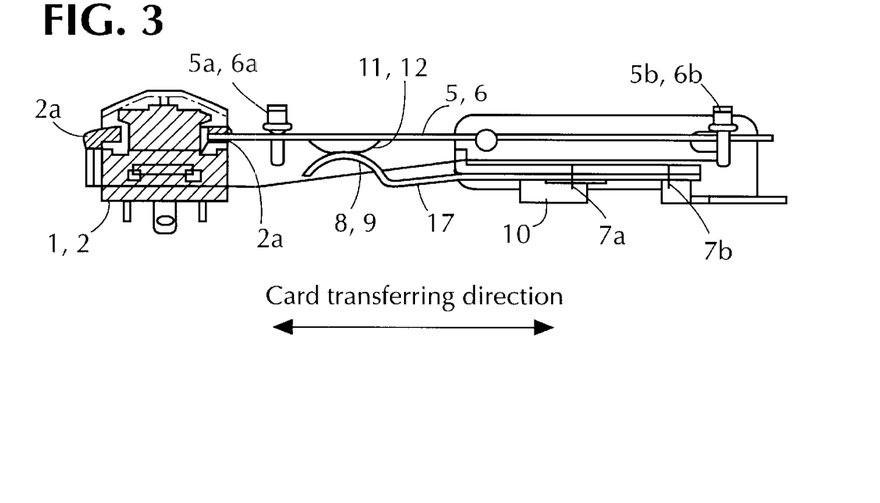
FIG. 3 is a side view of a second embodiment of the present invention.
Figure 4A:
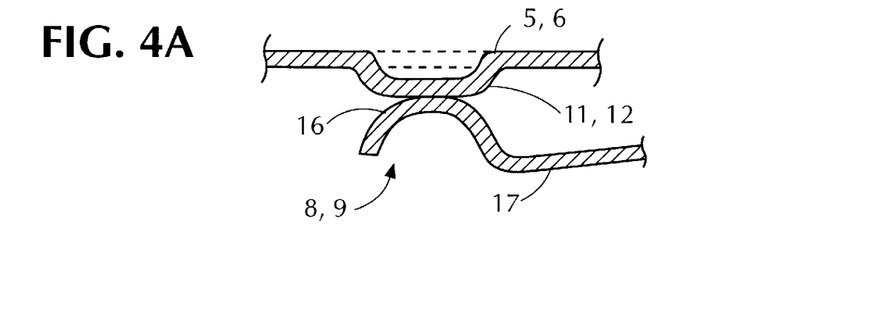
FIG. 4(a) is a cross section showing a pressure applying portion and a projecting portion used in the second embodiment.
Figure 4B:
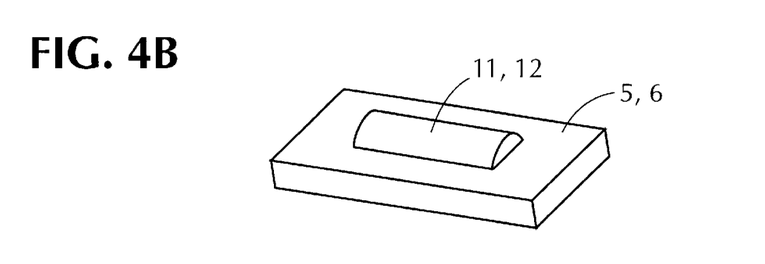

Additionally, according to FIGS. 1 and 2(a), a part of pressure applying portions 8 and 9 of leaf spring 17 is formed as horizontal portion 16, extended in the card transferring direction such that projecting portions 11 and 12 of head support plates 5 and 6 contact pressure applying portions 8 and 9 of leaf spring 17 within a length of horizontal portion 16. On the other hand, according to FIGS. 3 and 4(a), a horizontal portion may be formed on projecting portions 11 and 12 of head support plates 5 and 6 in the card transferring direction while pressure applying portions 8 and 9 of leaf spring 17 may be warped to form a hemisphere. The projecting portions can be formed as semi-cylindrical projections as shown in FIGS. 4(a) and 4(b). Then, pressure applying portions 8 and 9 can contact projecting portions 11 and 12 within a length of the horizontal portion of projecting portions 11 and 12.

Further, the above embodiment described the warped shape of magnetic card 3. When magnetic card 3 is swiped on the card transferring path of the magnetic card reader, magnetic card 3 may not be parallel to the plane on the card transferring path such that it may be transferred towards magnetic heads 1 and 2 while one end is hanging in the air. In such a case, magnetic heads 1 and 2 can precisely follow the card in the configuration according to the present invention.

I claim:

1. A head support mechanism in a magnetic card reader comprising:

head support plates which support magnetic heads such that said magnetic heads can rock on an axis parallel to the direction in which a magnetic card is transferred;

a leaf spring having a pressure applying portion which applies pressure to said head support plates in a direction to cause said magnetic heads to contact a magnetic card transferred through said reader; and said head support plates having a projecting portion extending in the direction perpendicular to the card transferring direction to contact said pressure applying portion of said leaf spring, whereby said leaf spring applies pressure to said projecting portions.

2. A head support mechanism in a magnetic card reader according to claim 1 in which said pressure applying portion of said leaf spring is elongated for a given length to ensure that said pressure applying portion and said projecting portion come in contact with each other.

3. A head support mechanism in a magnetic card reader according to claim 1 in which said projecting portion of said head support plates is elongated for a given length to ensure that said pressure applying portion and said projecting portion come in contact with each other.

4. A head support mechanism in a magnetic card reader according to claim 1 in which:

said head support plates are restrained by two positioning pins in the card transferring direction; said axis being defined by a line between said positioning pins and said magnetic heads which are supported by said head support plates being capable of rocking about said axis.

5. A head support mechanism in a magnetic card reader according to claim 4 in which said projecting portion is placed on a line between said two positioning pins.

6. A head support mechanism in a magnetic card reader according to claim 1 in which said pressure applying portion of said leaf spring is a warped portion of said leaf spring.

7. A head support mechanism in a magnetic card reader according to claim 6 in which:

said warped pressure applying portion of said leaf spring and said projecting portion of said head support plate are formed such that one of those parts comes in contact with the other at one point in the card transferring direction; and said other part has a horizontal portion which extends in the card transferring direction.

8. A head support mechanism in a magnetic card reader according to claim 1 in which:

said head support plates are restrained by two positioning pins in the card transferring direction; and said projecting portion for at least one of said plates is placed off a line between said two positioning pins.

9. In a head support mechanism for a magnetic card reader having first and second head support plates which support first and second magnetic heads; which plates have positioning pins that permit the magnetic heads to rock on a longitudinal axis which axis is parallel to the direction in which the magnetic card is transferred; the reader having a leaf spring with first and second arms to apply pressure on said support plates in a direction that causes the magnetic heads to contact whatever magnetic card is being transferred through the reader, the improvement comprising:

first and second projecting portions formed on the first and second head support plates respectively, said portions projecting in a direction that contacts the pressure applying arms of the leaf spring,     said projecting portions of the head support plates having a predetermined position relative to the axis between the positioning pins of each head support plate to assure that the force transmitted from the leaf spring is transferred to the corresponding head support plate at said predetermined position.

10. A head support mechanism in a magnetic card reader comprising:

head support plates which support magnetic heads such that said magnetic heads can rock on an axis parallel to the direction in which a magnetic card is transferred;

a leaf spring having a pressure applying portion which applies pressure to said head support plates in a direction to cause said magnetic heads to contact a magnetic card transferred through said reader;

said head support plate having a projecting portion extending in the direction perpendicular to the card transferring direction to contact said pressure applying portion of said leaf spring, whereby said leaf spring applies pressure to said projecting portions;

wherein:

said projecting portion of said head support plate is elongated for a given length to ensure that said pressure applying portion and said projecting portion come in contact with each other; and     said head support plates are restrained by two positioning pins in the card transferring direction; said axis being defined by a line between said positioning pins and said magnetic heads which are supported by said head support plates being capable of rocking about said axis.

11. A head support mechanism in a magnetic card reader comprising:

head support plates which support magnetic heads such that said magnetic heads can rock on an axis parallel to the direction in which a magnetic card is transferred;

a leaf spring having a pressure applying portion which applies pressure to said head support plates in a direction to cause said magnetic heads to contact a magnetic card transferred through said reader;

said head support plate having a projecting portion extending in the direction perpendicular to the card transferring direction to contact said pressure applying portion of said leaf spring, whereby said leaf spring applies pressure to said projecting portions;

wherein:

said projecting portion of said head support plate is elongated for a given length to ensure that said pressure applying portion and said projecting portion come in contact with each other; and     said pressure applying portion of said leaf spring is a warped portion of said leaf spring.

\* \* \* \* \*